Sept. 4, 1928.
W. C. STEWART
1,682,809
SORTING MACHINE
Filed Oct. 24, 1922
5 Sheets-Sheet 2
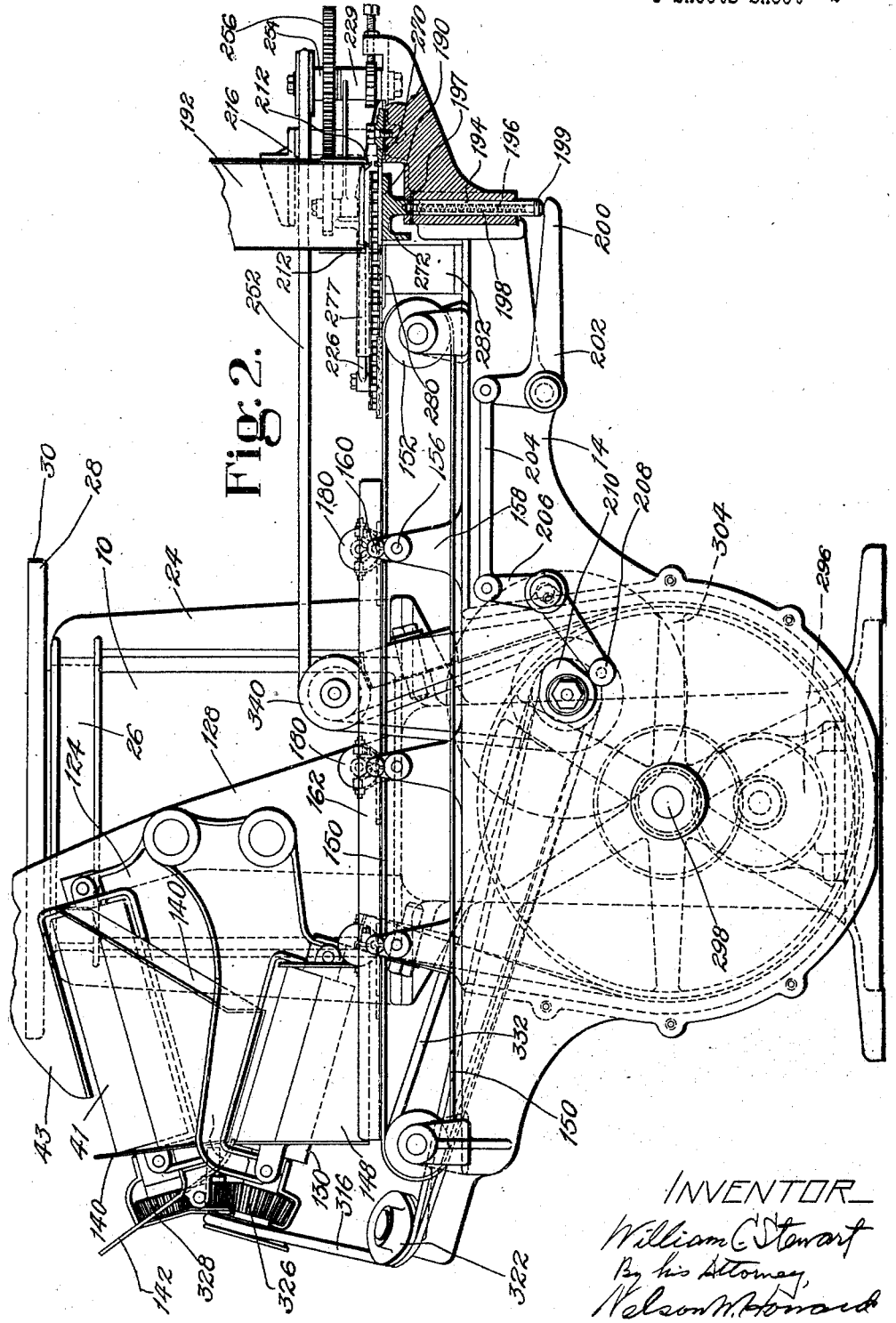

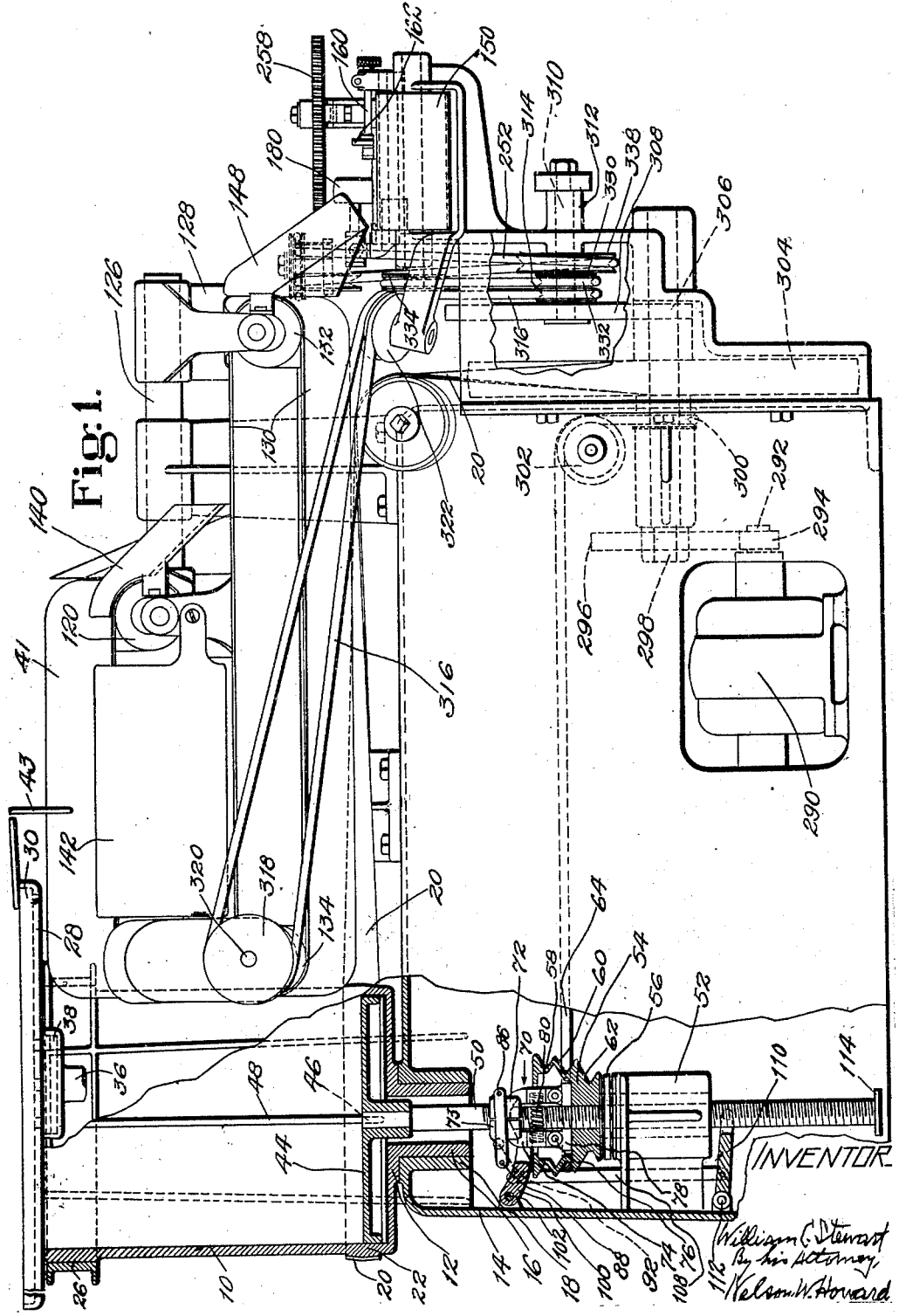

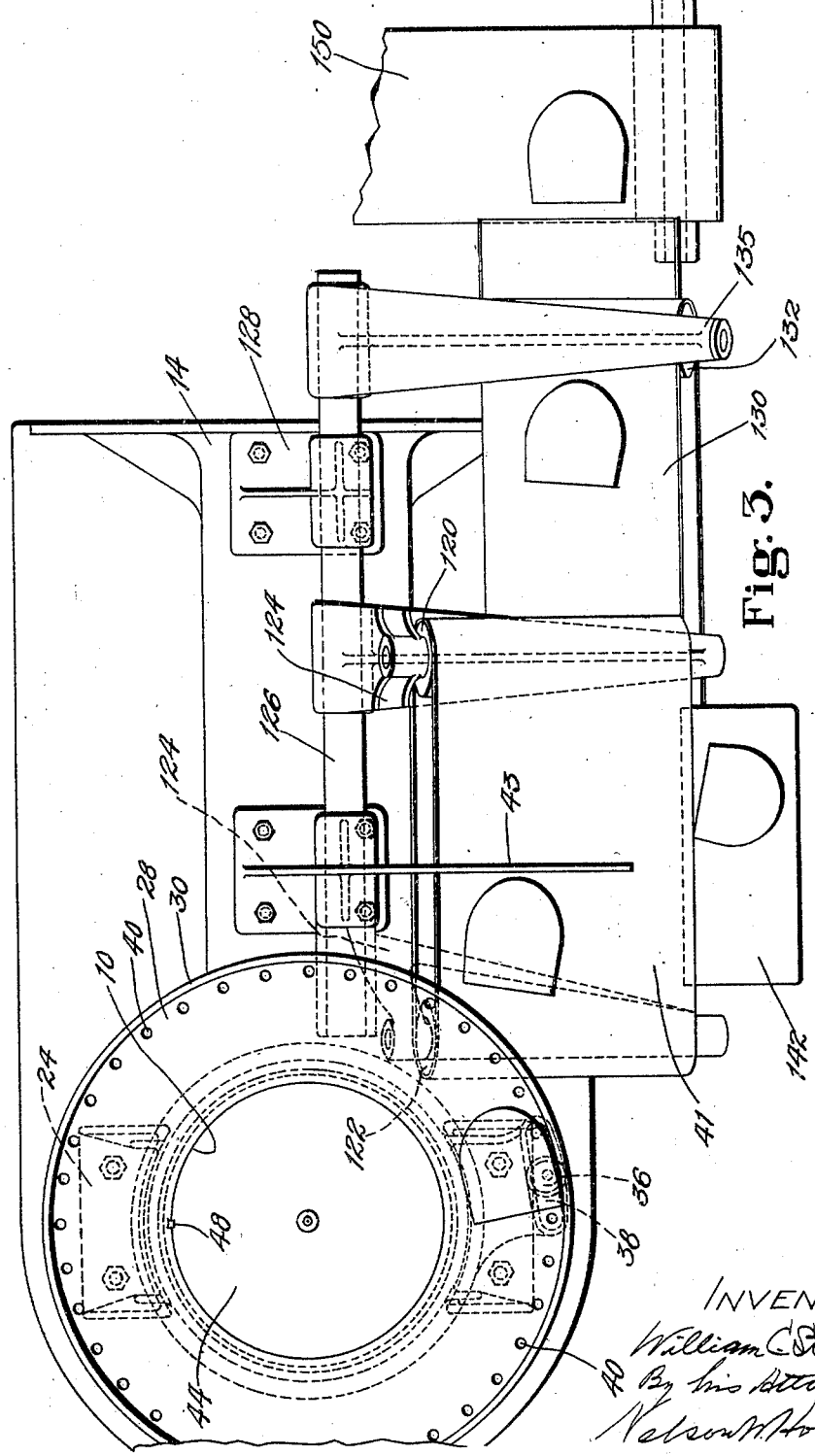

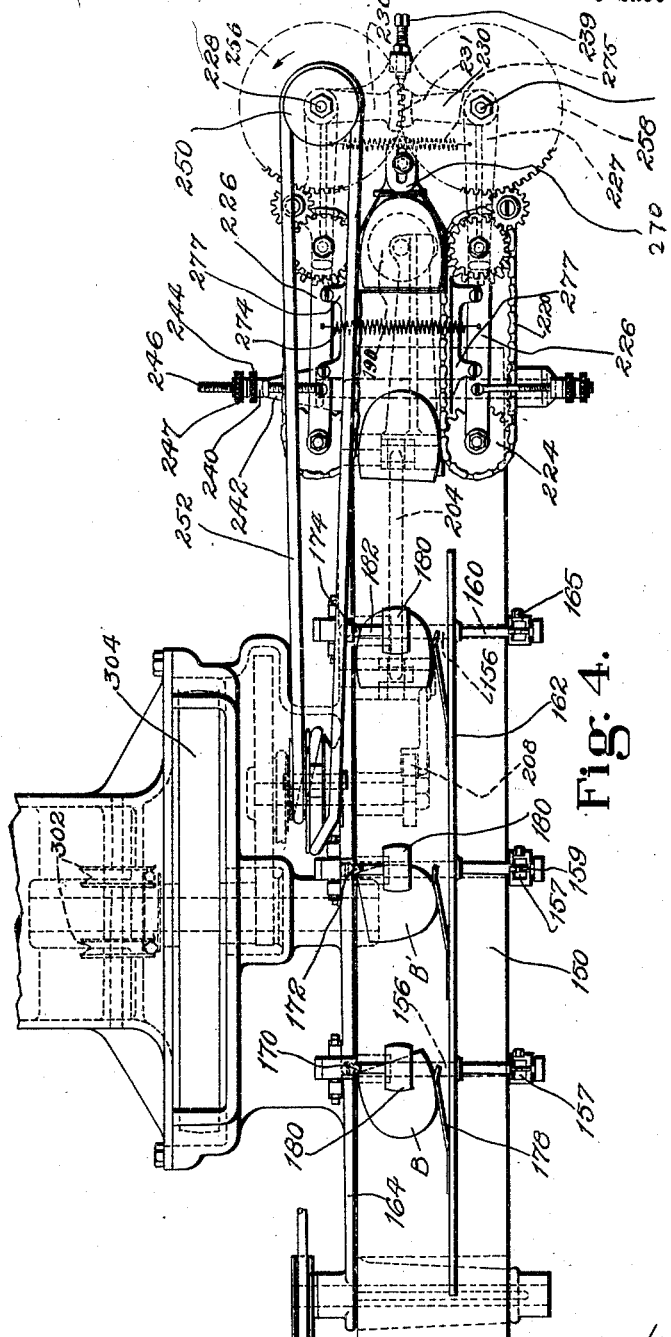

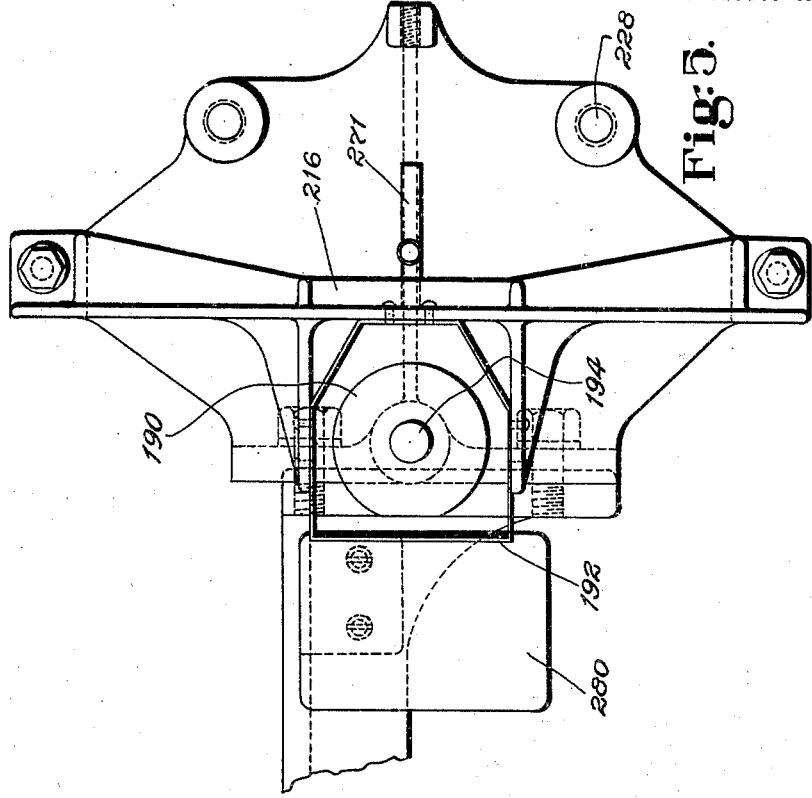
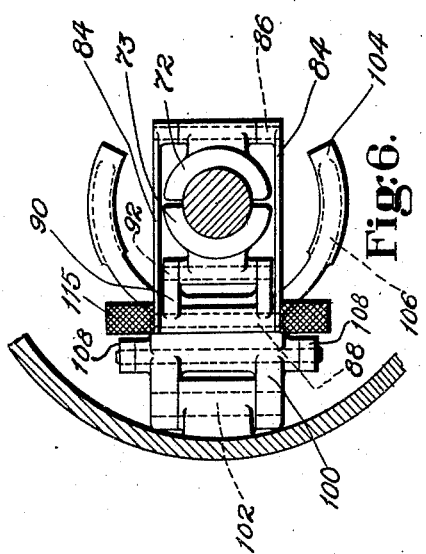
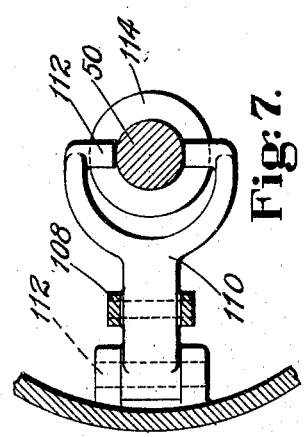

Patented Sept. 4, 1928.

1,682,809

UNITED STATES PATENT OFFICE.

WILLIAM C. STEWART, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY.

SORTING MACHINE.

Application filed October 24, 1922. Serial No. 596,650.

This invention relates to machines for receiving articles promiscuously in mass and arranging them in an orderly stacked relation.

It is an object of the invention to provide a machine of the character described which shall be especially simple in construction, efficient in operation and free from the deficiencies and defects which have characterized prior constructions.

In one aspect the invention resides in improved means dependent upon a characteristic of the article for turning certain of the articles as they move toward a discharge station so that all of them appear at the station with corresponding surfaces facing in one direction, for example upwardly.

In the illustrative construction an inclined conveyor is provided for receiving articles such as heel lifts, each having a smooth side and a relatively rough side, the arrangement being such that as the conveyor moves along those articles which are received with the smooth side resting on the conveyor are discharged by sliding off the conveyor in a direction transverse of its movement while the articles which land upon the conveyor with the relatively rough side serving as a supporting face are carried on and finally discharged in the direction of movement of the conveyor with the relatively rough side still serving as the supporting face. Preferably, means is provided for receiving from the conveyor either the set of articles discharged transversely of the conveyor or the other set mentioned and then turning each article of either set side for side. While in the illustrative machine means is provided for turning the set of articles discharged transversely of the conveyor it will be understood that other and substitute means may be provided for turning the set of articles so discharged or for turning the set discharged longitudinally of the conveyor without departing from the scope of the present invention. Following all of the articles which were received upon the conveyor with like sides facing in opposite directions may finally be deposited upon a support with their corresponding surfaces facing all in one direction.

In another aspect the invention contemplates the provision of means for receiving blanks or other articles in mass and arranging them in an orderly stacked relation during which certain of the blanks are turned side for side by means provided for that purpose, and certain of the blanks, whether the same or others, are turned end for end so that in the stack the articles have like sides facing all in the same direction and with analogous ends pointing all in one way.

While the illustrative machine is especially adapted to the handling of heel lifts of leather, it will be understood that the invention contemplates broadly sorting and stacking operations upon articles of various materials and having a variety of characteristics, it being essential only that the articles to be operated upon should possess or be provided with relatively rough and smooth surfaces upon either of which they may rest in stable equilibrium.

Other important features of the invention and novel combinations of parts will be described in the specification and pointed out in the appended claims.

In the drawings,—

Fig. 1 is a view in front elevation and partly in section of the machine, showing one embodiment of the invention;

Fig. 2 is a view in side elevation and partly in section of the machine shown in Fig. 1;

Fig. 3 is a top plan view of the front end of the machine;

Fig. 4 is a plan view of the side part of the machine shown in Fig. 2;

Fig. 5 is a plan view of the delivery end of the machine; and

Figs. 6 and 7 are details of the operating mechanism for blank receptacle.

In the illustrative machine there is preferably provided a receptacle 10 for the blanks or other articles that it is desired to magazine or otherwise stack in orderly arrangement. As shown, the receptacle 10 has its bottom portion 12 (Fig. 1) resting upon a portion of the machine frame 14 and provided with an extension 16 to serve as a journal in the bearing 18 provided in the machine frame. For rotating the receptacle there is provided a belt 20 passing around a crowned portion 22 on the lower portion of the periphery of the receptacle 10, the said portion serving as a pulley, whereby the receptacle is rotated from the continuously running belt 20. In order to maintain the receptacle in its upright position and support it against the thrust of the belt 20 there is provided a bracket comprising two arms 24 (Fig. 2) carrying an annular member 26 surrounding the upper end of the receptacle 10 and providing a bearing for said upper end during the rotation of the receptacle. Preferably, and as shown in the drawings, the receptacle 10 has a flange portion 28 integral with, or fixedly carried by, the receptacle so as to be rotated therewith and adapted to receive the blanks or other articles as they are progressively moved upwardly over the upper edge of the receptacle 10. In the construction shown the flange member 28 has an upwardly turned edge 30 for retaining the blanks which would otherwise fly off at various points during the rotation of the receptacle, the construction being preferably such as to provide for delivery of the blanks at a predetermined point only in order that the latter may be properly directed into the machine. Means is provided for discharging the blanks at this predetermined point, the said means comprising, in the construction shown, a pneumatic mechanism which includes a tube 36 (Figs. 1 and 3) leading to a nozzle 38 which is of a size to communicate at all times with a plurality of openings 40 in the flange portion 28 of the receptacle, said openings being located just inside of the upwardly turned edge of the flange. As illustrated, the nozzle 38 is of a size to communicate with three of the openings 40 in the flange at one time, the result being that a blank or other article resting over two or more of the openings will be lifted sufficiently by the jet of air as they come over the nozzle to permit the centrifugal force to project the blank over the edge 30 of the receptacle and in a direction to land upon the belt or other carrier 41, a baffle plate 43 being provided to prevent the blanks from being thrown too far. It will be understood that the air which comes under pressure through the tube 36 may be provided by a pump driven from the main shaft of the machine or from any other suitable source of power. If desirable, the air may be derived from an entirely independent pneumatic mechanism, for instance, by providing proper connections or attachments to a blower mechanism now commonly installed in factories.

In order to discharge the blanks or other articles which are dumped into the upper end of the receptacle 10 in a promiscuous mass, the said receptacle is conveniently provided with a movable bottom 44 (Fig. 1) having a vertical slot 46 at one point in its periphery adapted to engage with a rib 48 on the inside of the receptacle 10. Integral with, or fixedly secured to, the movable bottom 44 is a rod 50 which is screw threaded throughout the greater part of its length and which passes through a support 52 for a pulley block 54, there being preferably provided between the pulley and the upper end of the support 52 a ball-bearing plate 56, as shown most clearly in Fig. 1 of the drawings. Conveniently, the pulley block 54 comprises, or is provided with, a plurality of pulleys such as those shown at 58, 60, and 62 so that by shifting the driving belt 64 the pulley block may be driven at different speeds. Mounted upon the pulley block 54 is a screw threaded member 70 for engaging with the screw threaded portion of the rod 50 so that upon rotation of the receptacle 10 and of the pulley block 54 at different speeds the movable bottom 44 will be caused to travel upwardly in the receptacle.

Means is preferably provided for automatically terminating the upward movement of the movable bottom within the receptacle and for returning it to initial position. In the construction shown this operation is conveniently provided for by a special construction and arrangement of the screw threaded nut 70 which is shown as two semi-circular members 72, 73 (Figs. 1 and 6) integral with or fixedly carried by the upper ends of link members 74 pivoted at 76 upon a base 78 fixedly carried by the block 54, a spring 80 being provided which tends constantly to separate the two nut members 72, 73. In the construction shown, these nut members 72, 73 are held in firm contact with the screw threaded rod 50 by means of a toggle mechanism shown in plan in Fig. 6 as consisting of two side links 84 pivoted at 86 upon the nut member 72 and at their opposite ends upon a pin 88 carried by a yoke 90 which is in turn pivotally supported upon a pin 92 carried by the other nut member 73. It is clear that upon moving the free end portions of the links 84 upwardly that the toggle mechanism, of which the links are a part, is broken, permitting the nut members 72, 73 to be separated by the action of the spring 80 and that upon return of the free ends of the links 84 to their lowermost position of rest that the toggle will be reset to clamp the nut members 72, 73 in contact with the screw threaded portion of the rod 50 and that the toggle will remain in the said position by reason of the fact that the pin 88 in the locked position of the toggle is below the center of the pin at 92 (see Fig. 1). In order to stop the upward movement of the rod 50 and, perforce, of the movable bottom 44, it is necessary merely to lift the free ends of the links 84 upwardly, and this may be readily done by hand. Preferably, however, means is provided for accomplishing this result at the proper time without the intervention of the operator. In the construction shown this means comprises a trip member 100 (Figs. 1 and 6) pivoted at 102 to a stationary part of the machine frame and having a portion which underlies the free ends of the links 84 so as to contact with and lift the same upon upward movement of the trip member 100. For supporting the trip member 100 it is provided with a pair of arms 104 having rounded portions 106 which rest upon the upper surface of the pulley block 54. Pivoted to the side portions of the trip member 100 is a pair of links 108, the lower ends of which are pivoted in turn to a trip actuating member 110 (Figs. 1 and 7) pivotally mounted at 112 upon a stationary bracket or on the frame of the machine, said actuating member 110 having portions 112 arranged in the path of the disk 114 fixedly secured to, but adjustable upon, the rod 50. It will be understood that at a certain point in the upward movement of the rod 50 the disk 114 will contact with the actuating member 110 to lift the same and that the resulting upward movement of the member 110 will be communicated to the trip member 100 so that the latter will at the proper time contact with and lift the free ends of the toggle links 84, thus effecting disconnection of the nut 70 from the rod 50. When this occurs the movable bottom 44 drops back to its initial position in the bottom of the receptacle 10. To reset the mechanism it is necessary merely, as before stated, to depress the free ends of toggle links 84, by pressure upon the finger pieces 115, thus resetting the toggle mechanism and rendering operative the screw threaded nut 70.

The means for arranging the blanks or other articles in such manner that the like sides of all the blanks face in the same direction comprises, in the construction shown, the belt 41 which receives the blanks or articles from the receptacle 10, the said belt being relatively broad and being mounted upon a pair of rollers 120, 122, the latter being positively driven through gear mechanism which will be hereinafter described, the rollers being mounted in an inclined position by brackets 124 carried adjustably by a stationary rod or bar 126 carried in turn by brackets 128 mounted on the machine frame 14. Mounted below the belt 41 is a second carrier or belt 130 running on rollers 132, 134 the latter of which is positively driven through mechanism which shall be hereinafter described. Any convenient means may be provided for mounting the rollers such as brackets, one of which is shown at 135. If desired, the rollers 132, 134 may be inclined to the horizontal so that the belt 130 may be also inclined transversely of its direction of movement. If it is so inclined, it is in the opposite direction from the inclination given to the upper belt 41, as will be evident from an inspection of Fig. 2 of the drawings. Conveniently, the belt 41 is made of leather having a highly polished surface so that as the articles are delivered upon the belt those which land thereon with their smooth sides in contact with the belt slip off transversely of the belt before they reach its delivery end, while those articles or blanks which land upon the belt with their relatively rough sides in contact with the belt are carried along to the delivery end of the belt where they slide down the chute 140 and are delivered upon the lower belt 130 with their rough sides resting upon the belt. Those blanks or articles which slide laterally from the belt 41 are received by a chute 142 and are delivered by the chute upon the lower belt 130 with their relatively rough sides facing downwardly and in contact with the belt 130 so that all of the articles which come from the receptacle 10 are delivered upon the belt 130 with their like sides all facing in the same direction, in the present case, all with their rough sides resting upon said belt 130. As shown, the chute 142 is a one-piece member which is so located and so curved as to receive the blanks as they fall from the belt 41 with the relatively rough side facing outwardly and downwardly and delivers them rough side down to the belt 130. The belt 130 will ordinarily be traveling in a horizontal plane and will be inclined, as it was suggested it might be, only if it is desired to get rid of blanks or articles which are smooth on both sides, it being obvious that as the blanks travel along the inclined belt 130 in Fig. 2 that the articles having smooth faces resting upon the belt will slide therefrom and be discharged from the machine. In case the blanks being handled by this machine are leather heel lifts having a grain side and a flesh side, it will happen infrequently indeed that one of the lifts will have both sides smooth enough to slide from both of the belts. Hence, the great majority of the blanks will be delivered from the delivery end of the belt 130 and over the chute 148 to another mechanism which, in the illustrated machine, is a mechanism for arranging the blanks or other articles with a given edge of all the blanks pointing in the same direction.

In the illustrative construction, the means for arranging the blanks or articles in orderly edge to edge relation with respect to each other comprises a belt 150 (Fig. 2) which is arranged to travel in a direction at right angles substantially to the direction of travel of the belt 130 in order that the machine may be more compact in its construction than if the belt were continued in the same direction with the belt 130. As shown, this belt 150 turns about rollers 152, 154, the latter of which is driven through power means which will be hereinafter described. Projecting under the belt 150 but spaced therefrom are rods 156 carried by brackets 158 and having at their free ends holders 157 having each a slot therein for adjustably receiving the reduced portion 159 of each rod 160 for mounting a guide piece 162, said guide piece serving as a side of a trough, of which the bottom is the belt 150 and the other side a member 164 carried also by the brackets 158. It will be understood that by manipulation of the binding screw 165 the rods 160 may be adjusted and then secured in place thus making it possible to adjust the side 162 of the trough. In order to turn certain of the blanks in their own planes there is provided a means for engaging parts of those blanks which arrive at a certain point with a certain edge or portion thereof as the advance portion of the particular blank. Where heel lifts are being arranged the means referred to comprises projections or abutments 170, 172, 174 projecting into the path of the lifts and adapted to engage a corner of the lift which is moving with its breast edge in advance, this being illustrated in connection with the blank B (Fig. 4). This projection or abutment 170 would also engage a side edge of the lift when it is advancing in the position of the blank B'. In each case the blank is dragged along by the belt on which it rests, thus causing it to turn until the convex edge of the blank is presented in the forward direction, in which case in its further forward movement it is unobstructed. As shown, the third projection or locating abutment 174 can be depended upon to complete the positioning of any lift which has not been completely turned by the first two locating abutments 170, 172. To insure that the blanks will engage with the locating abuments there is provided means in the form of springs 178 which guide the lifts over toward the abuments and yield in such a manner as to permit the blanks to pass during the turning movement as will be clear from an inspection of Fig. 4. Preferably, means is provided for preventing upward displacement of the lifts during the time that they are engaged by the spring 178 and the locating abutment opposite to the spring, said means comprising, in the illustrated construction, antifriction rollers 180 mounted to turn freely upon rods 182 extending out over the belt 150 from the brackets 158. It will be understood that those lifts which are advancing along the belt 150 with their convex edges in advance are also operated upon by the locating abutments 170, 172, 174, but to a lesser extent, just causing alinement of the blanks with the direction of movement of the belt, the result being finally that all the lifts reach a discharge position with their convex edges in advance, that is, pointing in the direction of the feeding movement of the supporting belt.

Means is preferably provided for stacking the blanks in the orderly arrangement in which they are now received from the belt 150 that is, all of a given side facing upwardly and with a given edge pointing in the direction of feeding movement of the last named belt. In the construction shown a feeder member 190 (Figs. 2 and 5) is provided for forcing the blanks one at a time upwardly into a magazine 192, the plunger comprising a hollow rod member 194 in which is seated a spring 196 bearing against a cross pin 197 at its upper end so as to be compressed during upward movement of the member 190 and thus be effective to project member 190 downwardly at the proper time. The socket 198 in the rod member 194 is closed by a plug 199 contacted by one end 200 of a bell crank 202 pivoted upon the frame of the machine and connected by a link 204 to a lever 206 which carries at its opposite end a roll 208 to be operated by a cam 210, it being clear that at each rotation of the cam 210 the feeder member 190 will be projected upwardly a predetermined distance by which the blank at the time resting on its upper surface will be forced into the magazine 192, return of the member 190 being effected by spring 196. If desired the magazine 192 may be made to be readily removable from the machine together with the blanks contained therein so that the magazines may be filled and removed in turn. For retaining the blanks in the magazine there is provided at the lower end thereof two or more spring pressed retaining members 212 having cam surfaces facing downwardly and outwardly so that as the blanks are shoved upwardly by the feeder member 190 they will cause lateral displacement of the retaining members 212, thus permitting the blanks to get into the magazine, whereupon the retaining members spring back into position to present supporting abutments which retain the last blank and all above it within the magazine while the pusher member 190 descends for a succeeding operation. Conveniently the magazine 192 is held in place by a bracket 216 by which it is supported.

As shown a separate means is provided for moving the blanks into position over the pusher member 190, the said means comprising, in the illustrated construction, feed chains 220 one on each side of the path of the blanks to engage opposite side edges of the blanks. Since the feed chains and the driving means therefor are identical the following description applies to both. Conveniently, each chain is mounted upon sprocket wheels 224 which are carried by a bar 226 pivoted at the end of an arm 227 having a sleeve on the post 228 which serves as a pivot therefor. Secured to the sleeve 229 is an arm 230, the outer end of the arm being provided with a segment rack 231, the teeth of which are in mesh with the teeth of a similar rack on the arm which is attached to the opposite sleeve 229, whereby both of the arms 227 move simultaneously and equally in opposite directions with respect to each other. In order that the feed chains 220 may engage the opposite sides of the blanks with the proper pressure, spring means is provided for yieldingly holding the bars 226 in their innermost position which is regulated by an adjustable member 239 contacting with a rear edge portion of one of the rack segments 231 and by connections to stops 240 carried by brackets 242 extending outwardly from the frame of the machine, the said stops being adjustably engaged by nuts 244 on rods 246 which pass slidably through the stops and are pivotally connected with the bars 226. If desired lock nuts 247 may be provided to secure the nuts 244 against turning.

As shown, one of the pivot posts 228 carries a pulley 250 which is driven from a belt 252, there being mounted on the sleeve 254 (Fig. 2) of the pulley 250 a gear wheel 256 which is constantly in mesh with a similar gear 258 on the other post 228, both of the gears 256, 258 being connected up through gears 260, 262 to drive the sprocket wheels 224. Preferably, the feed chains 220 are driven at a rate of speed greater than that of the belt 150 so as to separate the blanks, whereas the plunger or feeder member 190 is operated at a relatively high rate of speed so as always to keep the blanks from piling up in front thereof.

It should be pointed out that a gage 270 (Figs. 2 and 4) is provided at the rear of the feeder member 190 so as to position the blank properly thereon, the said gage being adjustable along the slot 271 (Fig. 5) so as to permit of its being accurately positioned with respect both to the plunger and the magazine. Furthermore, the feeder member or plunger 190 has an elongated controller portion 272 operative to check movement of the blanks while the feeder member is operating to push the blank into the magazine, it being understood that the feeder chains 220 engage the sides of the blanks yieldingly through the operation of the spring means before mentioned, which comprises a spring 274 which operates to draw the arms 226 together, and a second spring 275 which performs a similar function with respect to the arms 227. Preferably each arm 226 carries a plate 277 which acts as a backing for the operative or blank engaging portion of the chain 220.

As shown, the blanks are supported during their passage from the end of the belt 150 to their final position over the feeder member 190 by means of the yieldingly operated feed chains 220 and also by a plate 280 (Figs. 2 and 5) which is carried at the upper end of a bracket 282 attached to the frame 14 of the machine.

If desired, an electric motor 290 may be provided as a source of power for driving the operating parts of the machine, the armature shaft 292 of the motor being provided with a gear 294 which is constantly in mesh with a gear 296 on the shaft 298, the said shaft carrying a pulley 300 around which passes the cable 64 which, passing over idlers 302 engages with and drives pulley block 54 above described. Carried by the shaft 298 is a large pulley 304 about which passes the belt 20 which, as above described, is operative to rotate the receptacle 10. Also mounted on the shaft 298 is a gear 306 arranged to be constantly in mesh with a large gear 308 mounted fixedly on a counter-shaft 310 carried by a bearing 312 integral with or securely attached to the machine frame. Fixedly secured on the shaft 310 is a pulley 314 about which passes the cable-pulley 316 adapted to drive the pulley 318 on the shaft 320 of the roll 134. As shown, idler rolls 322 are provided between the pulleys 314 and 318 for guiding the belt or cable 316. Secured to the shaft 320 is a gear 326 (Fig. 2) which is arranged to be constantly in mesh with the gear 328 secured to the shaft of the roll 122 thus providing means for driving the belt 41. Also secured to the shaft 310 is a pulley 330 about which passes a cable-belt 332 which passes around a pulley 334 secured to the shaft of the roll 154 thus furnishing power means for driving the belt 150. Conveniently, the shaft 310 is provided with a pulley 338 about which passes a cable-belt 252 (Fig. 2) for driving the pulley 250 above described, the said cable-belt being guided intermediate of its ends over the idler pulleys shown at 340 (Fig. 2). It will be understood that while in the illustrated machine the various conveyor belts are driven from pulleys operated by cables, any other equivalent driving mechanism may be substituted for that shown.

In the operation of the machine, blanks or other articles are dumped in a promiscuous mass into the receptacle 10 over the edge of which they are gradually emptied upon the belt 41 which serves to separate those blanks or articles having a smooth side in contact with the belt from those which have a relatively rough side in contact with the belt. It is evident that this part of the mechanism may be utilized simply for the purpose of separating the articles having the characteristics described and delivering them to different discharge stations. In the machine shown, however, both groups of articles are delivered to the belt 130 with the same side of all the articles facing in the same direction. From the belt 130 the articles are discharged along the chute 148 to the belt 150 by which they are carried to the blank arranging mechanism shown in plan in Fig. 4, and in which all the articles are so arranged as to have one certain edge all pointing in the direction of movement of the belt. Finally, the blanks are stacked in the magazine 192. It will be seen, therefore, that blanks which were brought to the machine in a mass have been, through the operation of the machine, stacked with a given side of the blanks all facing in one direction and with a given edge all pointing in one direction. With the blanks thus stacked in an orderly arrangement they may be transferred to machines for other operations where the stacked arrangement greatly facilitates the operations to be performed upon the blanks or other articles.

Having described my invention, what I claim as new and desire to secure by Letters Patent of the United States is:—

1. In a machine of the character described, means for receiving blanks from a source of supply and for turning certain of the blanks and delivering all of them with a given side facing upwardly, in combination with means subsequently operative for arranging the blanks with their long axes pointing all in the same direction.

2. In a machine of the character described, means for receiving blanks from a source of supply and delivering them all with a certain side up and with a given edge of all the blanks pointing in the same direction, and means for arranging the blanks thus delivered in stacked relation.

3. In a machine for sorting heel lifts having relatively smooth and rough surfaces, a conveyor having a smooth surface upon which the lifts may be placed, means for mounting the conveyor with the said surface at an incline to the horizontal so that upon movement of the conveyor the lifts having their smooth surfaces facing downwardly will slide laterally therefrom while the others will be delivered in the direction of movement of the conveyor, and means for turning side for side those lifts which slide laterally from the conveyor.

4. In a machine of the character described, means for receiving blanks or other articles in a mass, and means for turning certain of the articles side for side and certain of the articles whether the same or others end for end so that all of the articles appear at the discharge station with the same side facing in one direction and a given edge pointing in the direction of movement of the articles.

5. In a machine of the character described, means for turning certain of the blanks or articles side for side and means to deliver them along with other blanks or articles which were received in a predetermined relation by the first-named means, and means for turning certain of the articles or blanks end for end so that all of the blanks or articles have a given edge pointing in the same direction.

6. In a machine for arranging heel lifts having a smooth grain and a relatively rough flesh side, means for receiving and turning those lifts received with the smooth face down and means for delivering them along with the other lifts received with the relatively rough face down, and means for delivering all of the lifts with the convex edge pointing in a given direction.

7. In a machine for stacking lifts having a smooth and a relatively rough side, means for receiving the lifts in a disorderly mass and delivering all of the lifts with the smooth side uppermost, and means for turning certain of the lifts and for stacking all the lifts with the breast edge pointing in one direction and the smooth side facing upwardly.

8. In a machine for handling blanks which have a smooth and a relatively rough surface, means for receiving all the blanks and turning over those received with the smooth face as the supporting face, said means comprising an upper and a lower belt, the upper belt being inclined transversely to its direction of travel, and a blank turning device between the belts.

9. In a machine for handling blanks which have a smooth and a relatively rough surface, means for receiving all the blanks and turning over those received with the smooth face as the supporting face, said means comprising two members one above the other, the upper member being movable and inclined transversely to its direction of movement, the inclination being such that the blanks resting on their smooth surfaces are discharged laterally to be received upon the lower member while the other blanks are discharged over the end of the movable member in the direction of its movement, and a blank turning device between the belts.

10. In a machine of the character described, a belt for receiving blanks from a source of supply, said belt being inclined transversely to its direction of travel, a second belt below the first belt for receiving all of the blanks from the upper belt, the inclination of the upper belt being such that blanks resting on their smooth faces slip laterally over a side edge of the belt and are discharged on the lower belt with the smooth faces pointing upwardly, while the other blanks are discharged over the end of the upper belt upon the belt below, and a blank turning device between the belts.

11. In a machine of the character described, a belt for receiving blanks from a source of supply, a second belt below the first-named belt for receiving the blanks therefrom, the first-named belt being so inclined that blanks resting on their smooth faces slip laterally therefrom while those resting on the other rougher face are discharged in the direction of movement of the first-named belt upon the second belt, and means for guiding the blanks discharged laterally from the upper belt to the lower belt and depositing them thereon with the smooth face uppermost.

12. In a machine of the character described, a belt for receiving blanks discharged thereon from a source of supply, the said belt being inclined transversely to its direction of movement, a lower belt for receiving the blanks from the upper belt, means for receiving the blanks from the upper belt which are discharged laterally therefrom turning and depositing them upon the lower belt with the other side up, and means for receiving the remaining blanks from the upper belt and discharging them upon the lower belt with the same side up, whereby all the blanks appear on the lower belt with the same side up.

13. In a machine for handling blanks which have a smooth and a relatively rough side, means for receiving the blanks comprising two members one above the other, the upper member being movable and inclined transversely to its direction of movement, the inclination being such that the blanks resting on their smooth sides are discharged laterally, and a stationary curved member for receiving blanks discharged laterally from the said upper member, turning them side for side and depositing them on the said lower member.

14. In a machine of the character described, a belt for receiving blanks from a source of supply, said belt being inclined transversely to its direction of travel, a second belt below the first belt for receiving the blanks from the upper belt, the inclination of the upper belt being such that blanks resting on their smooth sides slip laterally and are discharged therefrom, and stationary chutes for receiving blanks from the upper belt and depositing them on the lower belt with the smooth sides of the blanks all facing one way.

15. In a machine of the character described, a belt for receiving blanks from a source of supply, a belt below the first-named belt for receiving the blanks therefrom, the first-named belt being so inclined that blanks resting on their smooth faces slip laterally therefrom while those resting on the other rougher face are discharged in the direction of movement of the first-named belt upon the second belt, and means for turning the blanks discharged laterally from the upper belt and depositing them upon the lower belt with the smooth face uppermost.

16. In a machine of the character described, a belt for receiving blanks discharged thereon from a source of supply, the said belt being inclined transversely to its direction of movement, a lower belt for receiving the blanks from the upper belt, and means for receiving all the blanks from the upper belt and depositing them upon the lower belt with all of the blanks having the same side facing upwardly.

17. In a machine of the character described, a trough for receiving articles, a belt movable along the bottom of the trough, members projecting into the trough from one side thereof to engage the forward edge of certain of the articles, and spring means for holding the articles over toward the projecting members, whereby as the articles are carried along the trough, certain of them are turned due to co-operation of the movable belt and the projecting members.

In testimony whereof I have signed my name to this specification.

WILLIAM C. STEWART.